(12) United States Patent
Yamauchi et al.

(10) Patent No.: US 8,558,945 B2
(45) Date of Patent: Oct. 15, 2013

(54) DOME-SHAPED CAMERA

(75) Inventors: Ryuji Yamauchi, Fukuoka (JP); Tamotsu Uchida, Fukuoka (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 13/203,451

(22) PCT Filed: Feb. 17, 2010

(86) PCT No.: PCT/JP2010/000988
§ 371 (c)(1),
(2), (4) Date: Aug. 25, 2011

(87) PCT Pub. No.: WO2010/098045
PCT Pub. Date: Sep. 2, 2010

(65) Prior Publication Data
US 2011/0310293 A1 Dec. 22, 2011

(30) Foreign Application Priority Data
Feb. 27, 2009 (JP) ................... 2009 045542

(51) Int. Cl.
*H04N 5/225* (2006.01)
(52) U.S. Cl.
USPC ........................................ 348/373
(58) Field of Classification Search
USPC ............................... 348/373–375
See application file for complete search history.

(56) References Cited

U.S. PATENT DOCUMENTS

| | | | | |
|---|---|---|---|---|
| 5,394,184 | A * | 2/1995 | Anderson et al. | 348/211.4 |
| 7,586,537 | B2 * | 9/2009 | Konishi et al. | 348/374 |
| 7,614,804 | B2 * | 11/2009 | Kim | 348/373 |
| 2003/0103160 | A1 * | 6/2003 | Tatewaki et al. | 348/375 |
| 2008/0231699 | A1 | 9/2008 | Konishi | |
| 2010/0111516 | A1 * | 5/2010 | Basho | 396/427 |
| 2010/0225802 | A1 | 9/2010 | Yamamoto | |

FOREIGN PATENT DOCUMENTS

| | | |
|---|---|---|
| JP | 9-83841 | 3/1997 |
| JP | 2000-350058 | 12/2000 |
| JP | 2003-174572 | 6/2003 |
| JP | 2004-356668 | 12/2004 |
| JP | 2004-356669 | 12/2004 |
| JP | 2005-221637 | 8/2005 |
| JP | 2006-41895 | 2/2006 |
| JP | 2007-227994 | 9/2007 |

OTHER PUBLICATIONS

International Search Report dated Mar. 30, 2010.

* cited by examiner

*Primary Examiner* — Gevell Selby
(74) *Attorney, Agent, or Firm* — Dickinson Wright PLLC

(57) ABSTRACT

A dome-shaped camera (1) includes a body (3) including a camera unit (2), and a dome cover (4) that covers the camera unit (2). The body (3) includes a tilt table (9) that supports the camera unit (2) in such a manner that the camera unit (2) is rotatable in a tilt direction, a pan table (8) that supports the tilt table (9) supporting the camera unit (2) in such a manner that the tilt table (9) is rotatable in a pan direction, and an elastic member (13) that biases the tilt table (9) in a direction opposite to the pan table (8). The dome cover (4) includes an inner cover (5) that covers the camera unit (2), and an outer cover (6) that covers the inner cover (5). The tilt table (9) is movable in the direction toward the pan table (8) against an elastic force of the elastic member (13), and the inner cover (5) is mounted on the tilt table (9). Consequently, a dome-shaped camera with enhanced impact resistance is provided.

4 Claims, 5 Drawing Sheets

DOME-SHAPED CAMERA

TECHNICAL FIELD

The present invention relates to a dome-shaped camera including a dome cover that covers a camera unit, and specifically relates to a dome-shaped camera with enhanced impact resistance.

BACKGROUND ART

A dome-shaped camera is a camera apparatus provided with a dome cover that protects a camera unit, which is installed on, e.g., a ceiling or a wall of a facility or a building (see, for example, patent documents 1 and 2). Such dome-shaped cameras are often used as monitoring cameras; in such case, however, the dome-shaped cameras may be subject to attack, e.g., beaten by suspicious individuals who do not want to be monitored. Therefore, dome-shaped cameras used as monitoring cameras are required to have enhanced impact resistance (see, for example, patent document 3).

Some conventional dome-shaped cameras have a smoked dome cover to obscure the direction of the camera (monitoring direction), thereby enhancing the anti-crime capability. However, use of such a smoked dome cover may result in insufficient sensitivity of the camera depending on lighting conditions. Therefore, dome-shaped cameras including a dome cover with a dual structure (including an inner cover and an outer cover) have been proposed (see, for example, patent document 4). The dome-shaped cameras include an inner cover provided inside a transparent outer cover, and a window portion for securing a view of the camera is provided at the inner cover.

In general, in a conventional dome-shaped camera, an inner cover is mounted on a pan table, and the inner cover follows rotation in a pan direction of the camera, but cannot follow rotation in a tilt direction of the camera. Accordingly, such a conventional dome-shaped camera is provided with a cutout extending in the tilt direction at a window portion of the inner cover, in order to secure a view of the camera that rotates in the tilt direction.

However, since in the conventional dome-shaped camera, the inner cover is fixed to the pan table via a relatively-simple structure (for example, engagement using an engaging claw), upon the dome cover being subject to attack such as beating, the inner cover may be loosened by an impact force of the attack, leaving the camera disabled from continuing to take a picture.

CITATION LIST

Patent Literature

Patent Literature 1
  Japanese Patent Laid-Open No. 2004-356668
Patent Literature 2
  Japanese Patent Laid-Open No. 2004-356669
Patent Literature 3
  Japanese Patent Laid-Open No. 2003-174572
Patent Literature 4
  Japanese Patent Laid-Open No. 2007-227994

SUMMARY OF INVENTION

Technical Problem

The present invention has been made in view of the aforementioned background. An object of the present invention is to provide a dome-shaped camera with enhanced impact resistance.

Solution to Problem

An aspect of the present invention provides a dome-shaped camera. The dome-shaped camera includes a body including a camera unit, and a dome cover that covers the camera unit. The body includes a tilt table that supports the camera unit in such a manner that the camera unit is rotatable in a tilt direction, a pan table that supports the tilt table supporting the camera unit in such a manner that the tilt table is rotatable in a pan direction, and an elastic member that biases the tilt table in a direction opposite to the pan table. The dome cover includes an inner cover that covers the camera unit, and an outer cover that covers the inner cover. The tilt table is movable in the direction toward the pan table against an elastic force of the elastic member, and the inner cover is mounted on the tilt table.

As described below, there are other aspects of the present invention. Accordingly, the disclosure of the present invention is intended to provide a part of the aspects of the present invention, and is not intended to limit the scope of the invention described and claimed herein.

DESCRIPTION OF EMBODIMENTS

Figure 1:
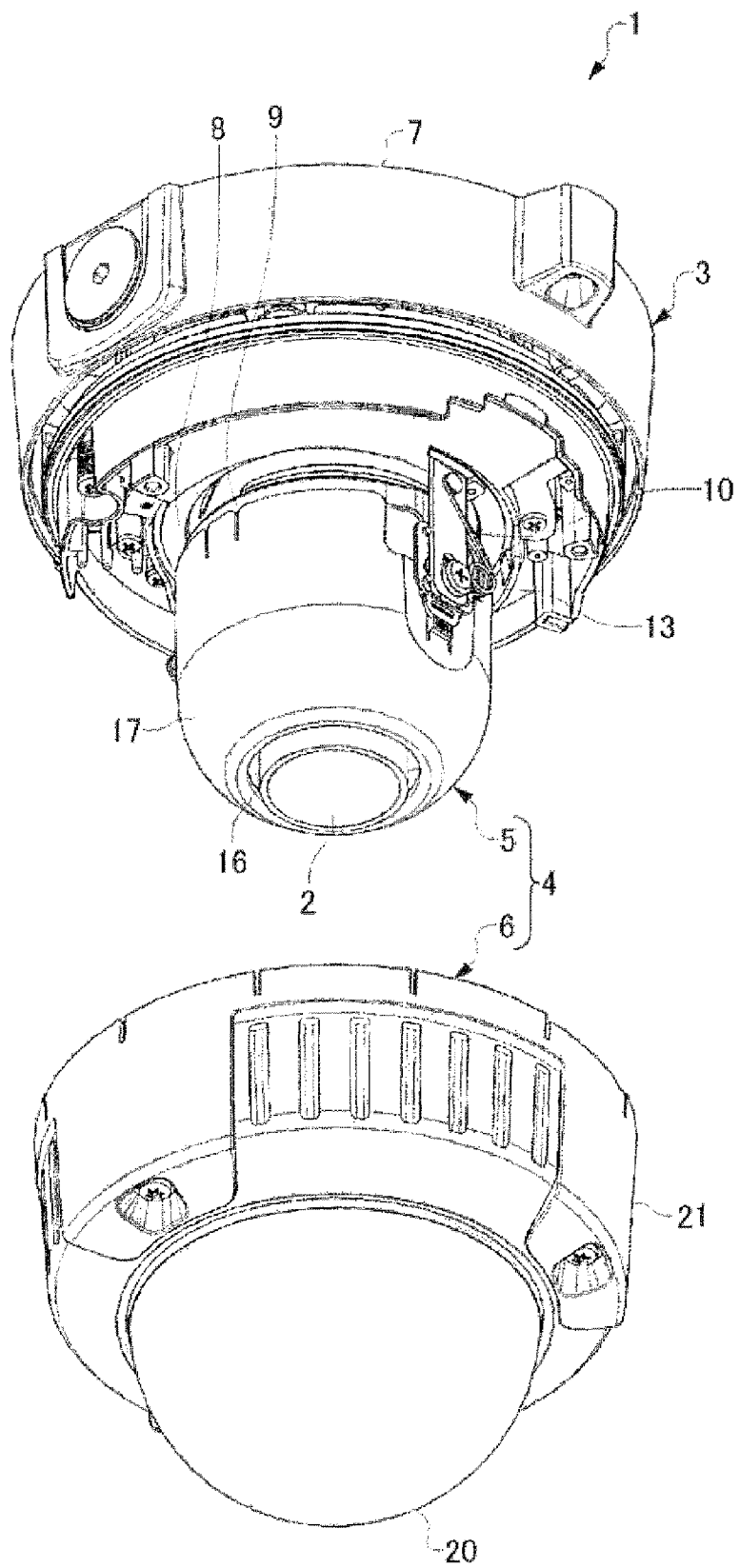
FIG. 1 is an exploded perspective view of a configuration of a dome-shaped camera according to the present embodiment.

A detailed description of the present invention will be described below. However, the below detailed description and the attached drawings do not limit the invention. Instead, the scope of the invention is defined by the attached claims.

However, since in a conventional dome-shaped camera, an inner cover is fixed to a pan table via a relatively-simple structure (for example, engagement using an engaging claw), a problem arises in that upon a dome cover being subject to attack such as beating, the inner cover may be loosened by an impact force of the attack, leaving the camera disabled from continuing to take a picture.

The present invention has been made in order to solve the aforementioned problem, and an object of the present invention is to provide a dome-shaped camera with enhanced impact resistance.

A dome-shaped camera according to the present invention provides a dome-shaped camera including a body including a camera unit, and a dome cover that covers the camera unit, the dome-shaped camera being configured so that: the body includes a tilt table that supports the camera unit in such a manner that the camera unit is rotatable in a tilt direction, a pan table that supports the tilt table supporting the camera unit in such a manner that the tilt table is rotatable in a pan direction, and an elastic member that biases the tilt table in a direction opposite to the pan table; the dome cover includes an inner cover that covers the camera unit, and an outer cover that covers the inner cover; the tilt table is movable in the direction toward the pan table against an elastic force of the elastic member; and the inner cover is mounted on the tilt table.

With such configuration, when the dome cover of the dome-shaped camera is beaten and the outer cover is thereby dented, an impact force of the beating is conveyed to the inner cover through the outer cover if the dent in the outer cover hits the inner cover. Here, the inner cover moves in the direction toward the pan table together with the tilt table while elastically deforming the elastic member. Accordingly, the impact force of the beating is absorbed, enabling the inner cover to be prevented from coming off. Furthermore, when the impact force of the beating has attenuated, the tilt table returns to its original position together with the inner cover by means of the elastic force of the elastic member, enabling the camera unit to continue to take a picture.

Furthermore, the dome-shaped camera according to the present invention may be configured so that: the inner cover includes a window portion provided at a position corresponding to a shooting direction of the camera unit, and an impact-resistant portion provided around the window portion; and the window portion includes no cutout extending in the tilt direction.

With such configuration, the window portion of the inner cover is provided with no cutout extending in the tilt direction, and thus, the strength of the impact-resistant portion around the window portion is increased, enhancing the impact resistance of the inner cover. In general, it is an apex portion of the dome cover (the outer cover) that is easily dented when the dome cover is beaten. A dome-shaped camera having a tilt function often takes a picture in a state in which its camera unit is tilted. If the dome cover is beaten in such a state and the apex portion of the outer cover is thereby dented, an impact force of the beating is applied to the obliquely-directed camera unit from the apex direction (apex angle). In other words, the impact force of the beating is obliquely applied to the camera unit. In this case, since the inner cover is mounted on the camera unit and the inner cover is provided with the impact-resistant portion around the window portion located in the shooting direction of the camera unit, the obliquely-applied impact force can be received by the high-strength impact-resistant portion. In this case, the inner cover is mounted on the tilt table, and thus, it is sufficient that the window portion of the inner cover is provided only at a position corresponding to the shooting direction of the camera unit. In other words, when the camera unit rotates in the tilt direction, the tilt table and the inner cover rotate together with the camera unit, and thus, a view of the camera unit can constantly be secured by the window portion of the inner cover.

Furthermore, the dome-shaped camera according to the present invention may be configured so that a shape of the impact-resistant portion includes a curved shape allowing a direction of a force applied from the apex portion of the outer cover to the impact-resistant portion of the inner cover to be changed to the direction toward the pan table.

With such configuration, when an impact force of a beating is conveyed to the inner cover through the outer cover, a direction of an impact force of the beating is changed to the direction toward the pan table. In other words, as described above, it is the apex portion of the dome cover (the outer cover) that is easily dented when the dome cover is beaten. A dome-shaped camera having a tilt function often takes a picture in a state in which its camera unit is tilted. If the dome cover is beaten in such state and the apex portion of the outer cover is thereby dented, an impact force of the beating is applied to the obliquely-directed camera unit from the apex direction (apex angle). In other words, the impact force of the beating is obliquely applied to the camera unit. In this case, when the dome cover of the dome-shaped camera is beaten and the outer cover is thereby dented, a direction of a force applied from the apex portion of the outer cover to the impact-resistant portion is changed to the direction toward the pan table if the dent in the outer cover hits the impact-resistant portion of the inner cover. Accordingly, even if an impact force of a beating is applied to the obliquely-directed inner cover, the inner cover moves in the direction toward the pan table while elastically deforming the elastic member, and the impact force of the beating is thereby absorbed, enabling the inner cover to be prevented from coming off.

Furthermore, the dome-shaped camera according to the present invention may be configured so that the inner cover includes a reinforcing rib at a position corresponding to the impact-resistant portion.

With such configuration, the impact-resistant portion of the inner cover is reinforced by the rib, enhancing the stiffness of the inner cover. Consequently, the impact resistance of the inner cover is further enhanced.

According to the present invention, the dome cover, upon being beaten, absorbs an impact force of the beating, enabling the inner cover to be prevented from coming off, enhancing the impact resistance.

Hereinafter, a dome-shaped camera according to an embodiment of the present invention will be described with reference to the drawings. The present embodiment will be described in terms of a case of a dome-shaped camera used as, e.g., a monitoring camera.

Figure 2:
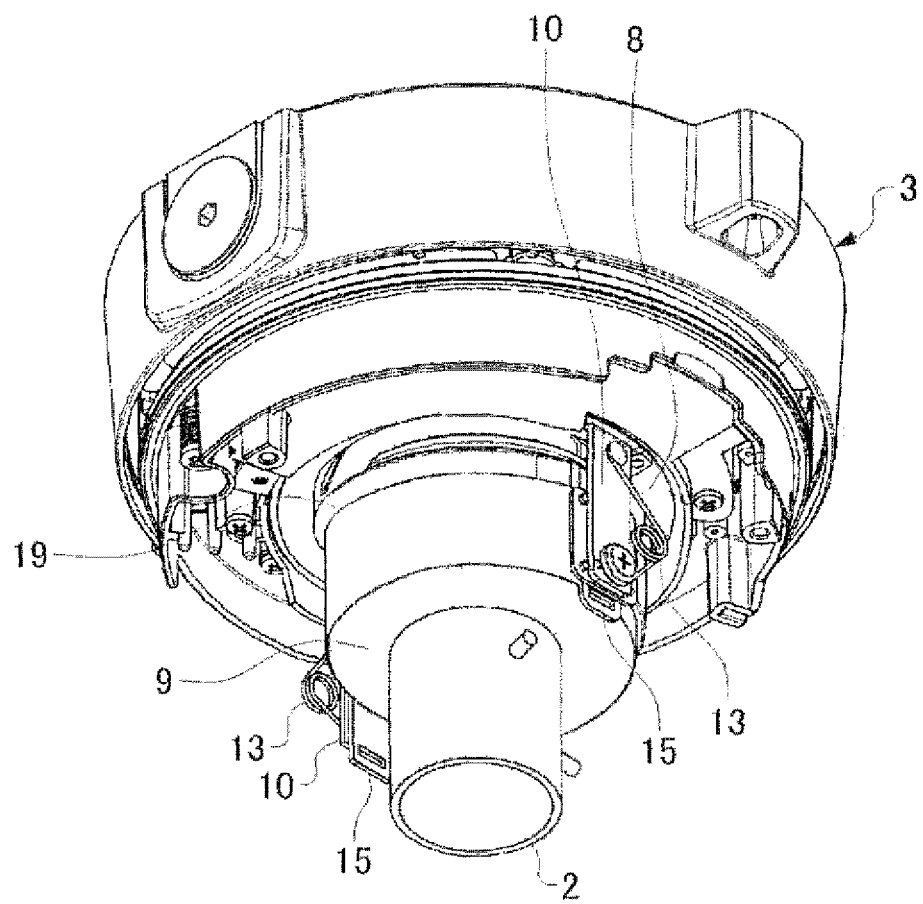
FIG. 2 is an exploded perspective view for description of the configuration of the dome-shaped camera.
Figure 2:
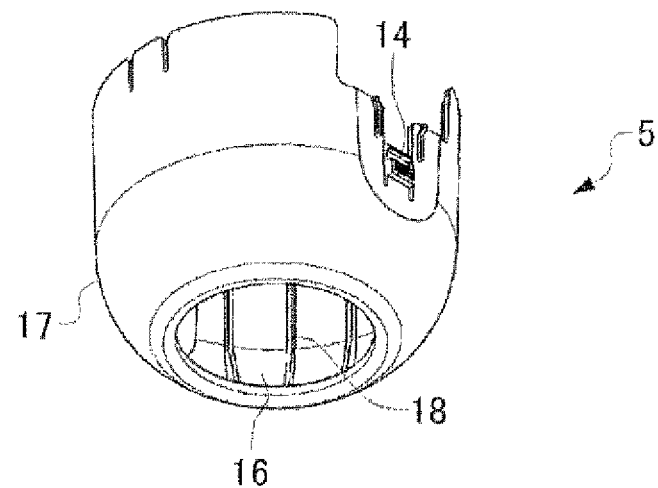

A configuration of a dome-shaped camera according to the present embodiment will be described with reference to the drawings. FIGS. 1 and 2 are exploded perspective views for description of the configuration of the dome-shaped camera (FIG. 1 illustrates a state in which an outer cover has been removed, and FIG. 2 illustrates a state in which an inner cover has been removed). As illustrated in FIGS. 1 and 2, a dome-shaped camera 1 includes a body 3 including a camera unit 2, and a dome cover 4 with a dual structure (including an inner cover 5 and an outer cover 6), which covers the camera unit 2.

The body 3 of the dome-shaped camera 1 includes a base 7 to be fixed to, e.g., a ceiling or a wall. A pan table 8 that is manually rotatable in a pan direction is mounted on the base 7, and a tilt table 9 that is manually rotatable in a tilt direction is mounted on the pan table 8. The camera unit 2 including an image sensor such as a CCD or a CMOS (not illustrated) is mounted on the tilt table 9. In other words, the tilt table 9 is configured so as to support the camera unit 2 in such a manner that the camera unit 2 is rotatable in the tilt direction, and the pan table 8 is configured so as to support the tilt table 9 supporting the camera unit 2 in such a manner that the tilt table 9 is rotatable in the pan direction. Although a case where the camera unit 2 is manually rotated in the pan direction and the tilt direction is described here as an example, the scope of the present invention is not limited to the case. A configuration in which a pan motor and/or a tilt motor are provided so as to automatically rotate the camera unit 2 in the pan direction and/or the tilt direction by means of driving forces of the motors may be employed.

Figure 4:
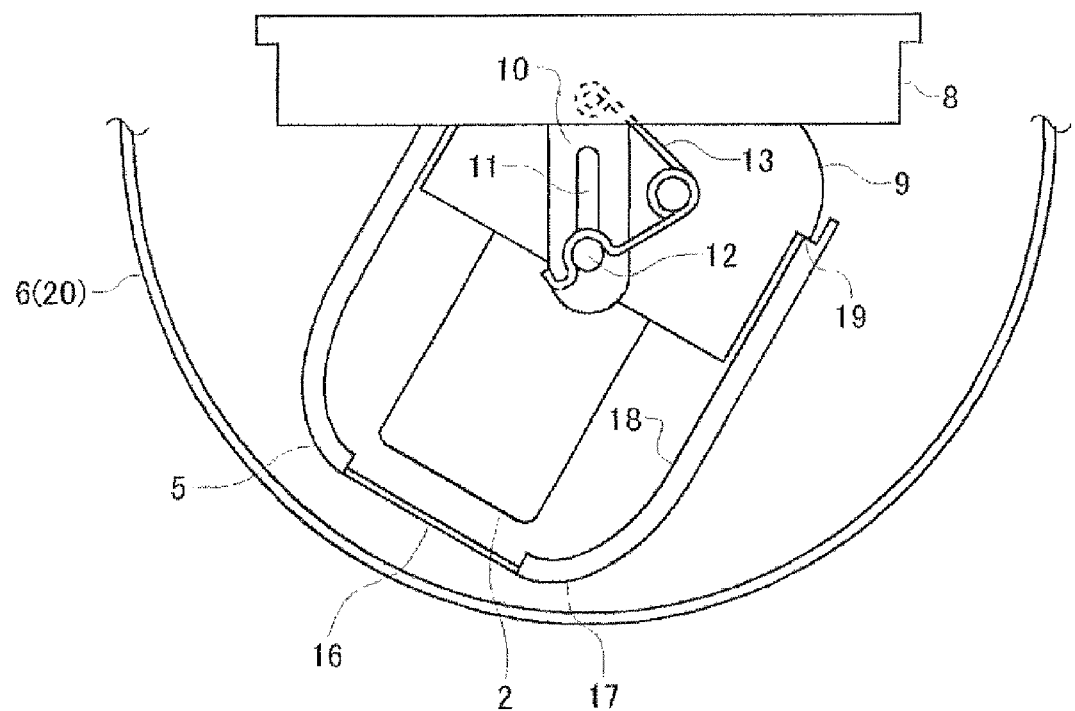
FIG. 4 is a side view of the dome-shaped camera.

The tilt table 9 is mounted on the pan table 8 in such a manner that the tilt table 9 can move in a vertical direction (the vertical direction in FIG. 4). More specifically, a pair of columns 10 stands on the pan table 8, and an elongated hole 11 that extends in the vertical direction (the vertical direction in FIG. 4) is provided in each column 10. A mounting screw 12 is slidably inserted through the elongated hole 11, and by means of the mounting screws 12, the tilt table 9 is mounted on the pan table 8 in such a manner that the tilt table 9 can move in the vertical direction (the vertical direction in FIG. 4). One end of a coil spring 13 is fixed to each of the mounting screws 12, and the other end of the coil spring 13 is fixed to the pan table 8 on the root-tip side of the column 10. By means of an elastic force of the coil springs 13, the tilt table 9 is biased in a direction opposite to the pan table 8 (the downward direction in FIG. 4). In other words, when the tilt table 9 moves in the direction toward the pan table 8 (the upward direction in FIG. 4), the tilt table 9 moves against the elastic force of the coil springs 13.

The inner cover 5, which is mounted on the tilt table 9, can move in the vertical direction (the vertical direction in FIG. 4) together with the tilt table 9. More specifically, the inner cover 5 is provided with a pair of outwardly-projecting engaging claws 14 (see FIG. 3), and a pair of engaging holes 15 is provided at positions in the tilt table 9 corresponding to the engaging claws 14 (see FIG. 2). When the inner cover 5 is put over the camera unit 2, the engaging claws 14 of the inner cover 5 engage with the engaging holes 15 of the tilt table 9, thereby the inner cover 5 being fixed to the tilt table 9 (see FIG. 1). Although a case where the inner cover 5 and the tilt table 9 are fixed to each other by means of engagement of the engaging claws 14 and the engaging holes 15 is described here, the scope of the present invention is not limited to this case. For example, the inner cover 5 and the tilt table 9 may be fixed to each other via, e.g., screws.

The inner cover 5 has a domed shape in its entirety, and is configured so as to cover the camera unit 2. A window portion 16 is provided at a position in the inner cover 5 corresponding to a shooting direction of the camera unit 2, and the window portion 16 secures a view of the camera unit 2 in the shooting direction. In this case, the window portion 16 has a circular shape, and includes no conventional cutout extending in the tilt direction. Furthermore, an impact-resistant portion 17 is provided around the window portion 16. The impact-resistant portion 17 receives an impact force applied in a direction oblique to the camera unit 2 (see FIG. 5). The impact-resistant portion 17 has a curved shape (see FIGS. 1 and 2), and a direction of a force applied from an apex portion of the outer cover 6 to the impact-resistant portion 17 is changed to the direction toward the pan table 8 (the upward direction in FIG. 5).

Figure 3:
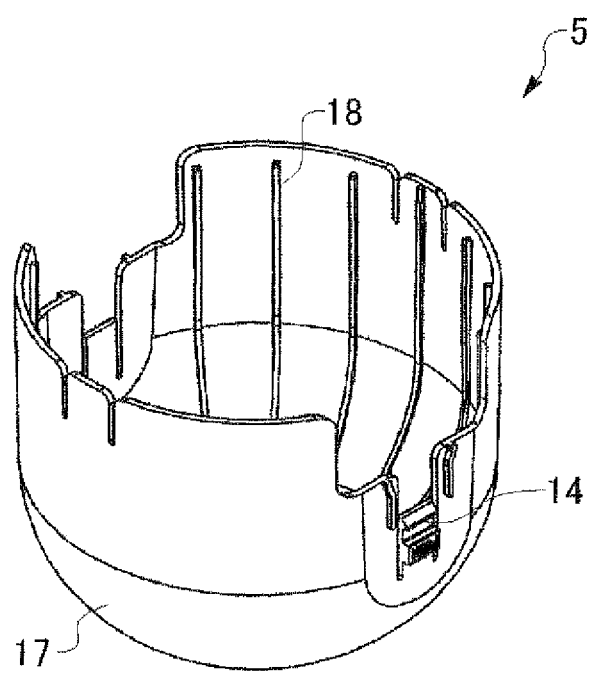
FIG. 3 is a perspective view of an inner cover viewed from a back side thereof.

As illustrated in FIG. 3, reinforcing ribs 18 are provided on an inner surface of the inner cover 5. The ribs 18 extend from a part of the inner cover 5 corresponding to the impact-resistant portion 17 (the curved shape part) to a side portion of the inner cover 5 (the cylindrical shape part). An end portion of each reinforcing rib 18 (the upper end portion in FIG. 3) is locked with a locking stepped portion 19 provided at an outer periphery of the tilt table 9 when the inner cover 5 is put over the camera unit 2 (see FIG. 4).

The outer cover 6 includes a dome-shaped cover portion 20 and a mounting portion 21 for mounting the cover portion 20 on the base 7 of the body 3. The cover portion 20 is a transparent or semi-transparent plastic cover, and the camera unit 2 covered by the inner cover 5 is covered by the cover portion 20. In this case, the body 3 of the dome-shaped camera 1 is covered by the outer cover 6 in its entirety.

An operation of the dome-shaped camera 1 configured as described above will be described with reference to the drawings.

An operation in a case where the dome cover 4 is beaten and the outer cover 6 is thereby dented in a state in which the camera unit 2 of the dome-shaped camera 1 is tilted will be described below as a characteristic operation of the present invention. It is the apex portion of the dome cover 4 (the outer cover 6) that is easily dented when the dome cover 4 is beaten. Therefore, here, an operation in a case where the apex portion of the outer cover 6 is dented will be described.

Figure 5:
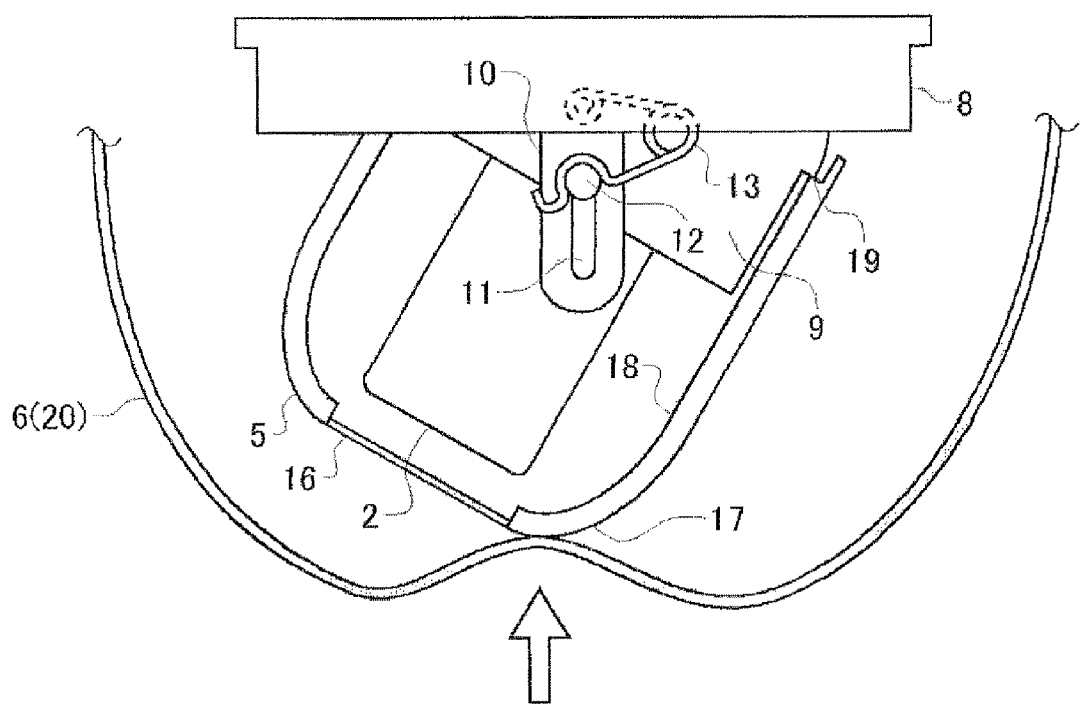
FIG. 5 is a side view for description of an operation when the dome-shaped camera is beaten.

For example, when the apex portion of the dome cover 4 is beaten while the camera unit 2 of the dome-shaped camera 1 is taking a picture with the camera unit 2 tilted at an angle as illustrated in FIG. 4, the apex portion of the outer cover 6 is dented and the dent in the outer cover 6 hits the inner cover 5. Then, as illustrated in FIG. 5, the impact force of the beating is conveyed to the inner cover 5 through the outer cover 6, and the inner cover 5 moves in the direction toward the pan table 8 (the upward direction in FIG. 5) together with the tilt table 9 while elastically deforming the coil springs 13.

Here, the dent in the outer cover 6 hits the impact-resistant portion 17 of the inner cover 5, and an impact force of the beating is received by the impact-resistant portion 17. Also, when the dent in the outer cover 6 hits the impact-resistant portion 17 of the inner cover 5, a direction of a force applied from the apex portion of the outer cover 6 to the impact-resistant portion 17 is changed to the direction toward the pan table 8 (the upward direction in FIG. 5). In other words, the direction of the applied force is changed by the curved shape of the impact-resistant portion 17 not to a force in a direction that is tangent to the curve (a direction in which the inner cover 5 is rotated in the tilt direction), but to a force in a direction that is normal to the curve (a direction in which the inner cover 5 is pushed toward the pan table 8 side). Accordingly, the inner cover 5 moves in the direction toward the pan table 8 together with the tilt table 9 while elastically deforming the coil springs 13.

Then, when the impact force of the beating has attenuated, the tilt table 9 returns to its original position together with the inner cover 5 by means of an elastic force of the coil spring 13.

With the dome-shaped camera 1 according to an embodiment of the present invention, when the dome cover 4 is beaten, an impact force of the beating is absorbed, enabling the inner cover 5 to be prevented from coming off, and thus, enabling impact resistance enhancement.

In other words, according to the embodiment of the present invention, when the dome cover 4 of the dome-shaped camera 1 is beaten and the outer cover 6 is thereby dented, an impact force of the beating is conveyed to the inner cover 5 through the outer cover 6 if the dent in the outer cover 6 hits the inner cover 5. Here, the inner cover 5 moves in the direction toward the pan table 8 together with the tilt table 9 while elastically deforming the elastic member. Accordingly, the impact force of the beating is absorbed, enabling the inner cover 5 to be prevented from coming off. Furthermore, when the impact force of the beating has attenuated, the tilt table 9 returns to its original position together with the inner cover 5 by means of an elastic force of the elastic member, enabling the camera unit 2 to continue to take a picture.

In this case, the window portion 16 of the inner cover 5 is provided with no cutout extending in the tilt direction, and thus, the strength of the impact-resistant portion 17 around the window portion 16 is increased, enhancing the impact resistance of the inner cover 5. In general, it is the apex portion of the dome cover 4 (the outer cover 6) that is easily dented when the dome cover 4 is beaten. A dome-shaped camera 1 having a tilt function often takes a picture in a state in which its camera unit 2 is tilted. If the dome cover 4 is beaten in such a state and the apex portion of the outer cover 6 is thereby dented, an impact force of the beating is applied to the obliquely-directed camera unit 2 from the apex direction (apex angle). In other words, the impact force of the beating is obliquely applied to the camera unit 2. In this case, since the inner cover 5 is mounted on the camera unit 2 and the inner cover 5 is provided with the impact-resistant portion 17 around the window portion 16 located in the shooting direction of the camera unit 2, the obliquely-applied impact force can be received by the high-strength impact-resistant portion 17. In this case, the inner cover 5 is mounted on the tilt table 9, and thus, it is sufficient that the window portion 16 of the inner cover 5 is provided only at a position corresponding to the shooting direction of the camera unit 2. In other words, when the camera unit 2 rotates in the tilt direction, the tilt table 9 and the inner cover 5 rotate together with the camera unit 2, and thus, a view of the camera unit 2 can constantly be secured by the window portion 16 of the inner cover 5.

Furthermore, when an impact force of a beating is conveyed to the inner cover 5 through the outer cover 6, a direction of an impact force of the beating is changed to the direction toward the pan table 8. In other words, as described above, it is the apex portion of the dome cover 4 (the outer cover 6) that is easily dented when the dome cover 4 is beaten. A dome-shaped camera 1 having a tilt function often takes a picture in a state in which its camera unit 2 is tilted. If the dome cover 4 is beaten in such a state and the apex portion of the outer cover 6 is thereby dented, an impact force of the beating is applied to the obliquely-directed camera unit 2 from the apex direction (apex angle). In other words, the impact force of the beating is obliquely applied to the camera unit 2. In this case, when the dome cover 4 of the dome-shaped camera 1 is beaten and the outer cover 6 is thereby dented, a direction of a force applied from the apex portion of the outer cover 6 to the impact-resistant portion 17 is changed to the direction toward the pan table 8 if the dent in the outer cover 6 hits the impact-resistant portion 17 of the inner cover 5. Accordingly, even if an impact force of a beating is applied to the obliquely-directed inner cover 5, the inner cover 5 moves in the direction toward the pan table 8 while elastically deforming the elastic member, and the impact force of the beating is thereby absorbed, enabling the inner cover 5 to be prevented from coming off.

Furthermore, in the present embodiment, the impact-resistant portion 17 of the inner cover 5 is reinforced by the ribs 18, enhancing the stiffness of the inner cover 5. Consequently, the impact resistance of the inner cover 5 is further enhanced. In this case, an end portion of each rib 18 is locked with a locking stepped portion 19 of the tilt table 9, and the impact force conveyed to the inner cover 5 is received. Accordingly, the ribs 18 also function to prevent the inner cover 5 from coming off.

Although embodiments of the present invention have been described above by way of example, the scope of the present invention is not limited thereto, and modifications and variations are possible according to purposes as long as such modifications and variations fall within the scope of the claims.

For example, although the above description has been provided in terms of an example in which the coil springs 13 are used as the elastic member according to the present invention, the scope of the present invention is not limited to this example and the present invention can also be carried out using another member as long as the other member has a function that biases the tilt table 9 in the direction opposite to the pan table 8.

Although a preferred embodiment of the present invention that is conceivable at the current point of time has been described, it should be understood that various variations of the present embodiment are possible, and the attached claims are intended to include all such variations within the true spirit and scope of the present invention.

Industrial Applicability

As described above, a dome-shaped camera according to the present invention provides the effect of impact resistance enhancement, and is useful for, e.g., a monitoring camera.

Reference Signs List 1 dome-shaped camera
2 camera unit
3 body
4 dome cover
5 inner cover
6 outer cover
8 pan table
9 tilt table
13 coil spring
16 window portion
17 impact-resistant portion
18 rib

The invention claimed is:

1. A dome-shaped camera comprising:
a body including a camera unit, and
a dome cover that covers the camera unit and is spaced apart therefrom, wherein:
the body includes a tilt table that supports the camera unit in such a manner that the camera unit is rotatable in a tilt direction, a pan table that supports the tilt table supporting the camera unit in such a manner that the tilt table is rotatable in a pan direction, and an elastic member that biases the tilt table in a direction opposite to the pan table;
the dome cover includes an inner cover that covers the camera unit, and an outer cover that covers the inner cover; and
the tilt table is movable in the direction toward the pan table against an elastic force of the elastic member, and the inner cover is mounted on the tilt table.

2. The dome-shaped camera according to claim 1, wherein:
the inner cover includes a window portion provided at a position corresponding to a shooting direction of the camera unit, and an impact-resistant portion provided around the window portion;
the window portion includes no cutout extending in the tilt direction.

3. The dome-shaped camera according to claim 2, wherein a shape of the impact-resistant portion includes a curved shape allowing a direction of a force applied from an apex portion of the outer cover to the impact-resistant portion of the inner cover to be changed to the direction toward the pan table.

4. The dome-shaped camera according to claim 2, wherein the inner cover includes a reinforcing rib at a position corresponding to the impact-resistant portion.

* * * * *